(12) United States Patent
Kim et al.

(10) Patent No.: US 11,868,037 B2
(45) Date of Patent: Jan. 9, 2024

(54) CAMERA ASSEMBLY AND ASSEMBLING METHOD THEREOF

(71) Applicant: HANWHA TECHWIN CO., LTD., Seongnam-si (KR)

(72) Inventors: Chang Yeon Kim, Seongnam-si (KR); Byeong Ho Lee, Seongnam-si (KR); Hye Jin Yu, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 18/068,202

(22) Filed: Dec. 19, 2022

(65) Prior Publication Data

US 2023/0120546 A1    Apr. 20, 2023

Related U.S. Application Data

(63) Continuation of application No. 17/201,786, filed on Mar. 15, 2021, now Pat. No. 11,531,251.

(30) Foreign Application Priority Data

Mar. 16, 2020  (KR) .................. 10-2020-0031832

(51) Int. Cl.
  *G03B 5/04*   (2021.01)
  *G02B 7/00*   (2021.01)

(52) U.S. Cl.
  CPC ............... *G03B 5/04* (2013.01); *G02B 7/005* (2013.01); *G03B 2205/0084* (2013.01)

(58) Field of Classification Search
  CPC ... G03B 5/04; G03B 2205/0084; G02B 7/005
  See application file for complete search history.

(56) References Cited

U.S. PATENT DOCUMENTS

| 4,631,044 A | 12/1986 | Redmon |
| 4,678,953 A | 7/1987 | Johnson |

(Continued)

FOREIGN PATENT DOCUMENTS

| CN | 108626333 A | 10/2018 |
| CN | 208845655 U | 5/2019 |

(Continued)

OTHER PUBLICATIONS

Communication dated May 21, 2021, issued by the European Patent Office in counterpart European Application No. 21162815.1.

(Continued)

*Primary Examiner* — Minh Q Phan
(74) *Attorney, Agent, or Firm* — Sughrue Mion, PLLC

(57) ABSTRACT

A camera assembly includes a motor configured to generate a driving power; a motor shaft that extends from the motor, such as to define a first axis, and is configured to rotate by the driving power of the motor; a pulley configured to rotate on a second axis, that is spaced from the first axis, according to rotation of the motor shaft; a belt configured to couple the motor shaft and the pulley, and convert the rotation of the motor shaft to rotation of the pulley, and tension of the belt applies a force to the motor shaft in a direction towards the second axis; a camera module configured to be mounted on the pulley and rotate together with the pulley; and an elastic body configured to apply a biasing force to the motor shaft such as to bias the motor shaft in a direction away from the second axis.

13 Claims, 7 Drawing Sheets

(56) References Cited

U.S. PATENT DOCUMENTS

| | | | |
|---|---|---|---|
| 5,214,448 A | 5/1993 | Venthem | |
| 2001/0046915 A1 | 11/2001 | Green et al. | |
| 2005/0113197 A1* | 5/2005 | Pong .......................... | F16H 7/14 |
| | | | 474/133 |
| 2008/0012980 A1 | 1/2008 | Yamane et al. | |

FOREIGN PATENT DOCUMENTS

| | | |
|---|---|---|
| CN | 209762610 U | 12/2019 |
| CN | 210141445 U | 3/2020 |
| CN | 211599425 U | 9/2020 |
| KR | 10-596780 B1 | 2/2016 |
| WO | 2013/166083 A1 | 11/2013 |

OTHER PUBLICATIONS

Communication dated Jun. 29, 2023 from the European Patent Office in EP Application No. 21162815.1.

\* cited by examiner

100

CAMERA ASSEMBLY AND ASSEMBLING METHOD THEREOF

CROSS-REFERENCE TO THE RELATED APPLICATIONS

This application is a continuation of U.S. application Ser. No. 17/201,786, filed on Mar. 15, 2021, which claims priority from Korean Patent Application No. 10-2020-0031832, filed on Mar. 16, 2020, in the Korean Intellectual Property Office, the disclosures of which are incorporated herein in their entireties by reference.

BACKGROUND

1. Field

Embodiments of the present disclosure relate to a camera assembly, and more specifically, to a camera assembly for transmitting via a timing belt the driving power from a motor to an output shaft coupled to a camera module.

2. Description of Related Art

A surveillance camera supporting pan/tilt/zoom functions may transmit driving power generated from a stepping motor to the output shaft. In order to transmit such a driving power, a timing belt is normally used to couple a motor shaft of the stepping motor and the output shaft.

By using the timing belt as a power transmission structure, a user can easily adjust a gear ratio and an axial distance. However, in terms of the power transmission, there is an important requirement that the tension of the timing belt should be maintained in an optimal state. In case that the tension of the timing belt is too low, there might be concerns about shakings of a camera and slips or malfunctioning of a motor. On the contrary, in a case where the tension of the timing belt is too high, there might be concerns about wear-out or damages of components in the camera assembly and a power reduction of the motor due to a load increase.

In this regard, there might be two schemes to solve the problem. The first scheme is to maintain the tension of the timing belt within a designed range by strict quality controls on dimensions and clearances of the related components. In addition, the second scheme is to adjust the tension of the timing belt by manual controls on the axial distance during the assembling process.

According to the first scheme, it is necessary to manage the size, clearance, and axial distance of a pulley in order to maintain the tension of the timing belt, but it inevitably results in a cost increase for quality controls on some components and a risk of defective products.

On the other hand, the second scheme has an advantage of reducing a defect rate by lowering the standard of clearance management on the related components when adjusting the axial distance during an assembling process for managing the tension of the timing belt. However, it requires an additional dedicated device for applying a proper tension during the assembling process. Additionally, it is inappropriate for a rework and does not address the problem that the axial distance changes due to an external force after completing the assembling process.

Further, even after a proper tension is applied to the timing belt, a decentering or an eccentricity may be caused due to a setting angle of the camera assembly and surroundings around the camera assembly, which makes the tension of the timing belt change from the designed value.

SUMMARY

According to embodiments of the present disclosure, a camera assembly is provided in which tension of a timing belt is adaptively adjusted without unnecessary efforts such as strict clearance managements for components during an assembling process or adjustments of an axial distance.

Also provided is a camera assembly in which tension of a timing belt is adaptively adjusted in spite of changes in a setting angle of the camera assembly or surroundings around the camera assembly.

However, aspects of embodiments of the present disclosure are not restricted to those set forth herein. Various other aspects of embodiments of the present disclosure will become more apparent to one of ordinary skill in the art to which the embodiments of the present disclosure pertain by referencing the detailed description of the embodiments given below.

According to one or more embodiments, a camera assembly is provided. The camera assembly includes: a motor configured to generate a driving power; a motor shaft that extends from the motor, such as to define a first axis, and is configured to rotate by the driving power of the motor; a pulley configured to rotate on a second axis, that is spaced from the first axis, according to rotation of the motor shaft; a belt configured to couple the motor shaft and the pulley, and convert the rotation of the motor shaft to rotation of the pulley, and tension of the belt applies a force to the motor shaft in a direction towards the second axis; a camera module configured to be mounted on the pulley and rotate together with the pulley; and an elastic body configured to apply a biasing force to the motor shaft such as to bias the motor shaft in a direction away from the second axis, wherein the force and the biasing force are balanced such that a distance between the first axis and the second axis is adaptively adjusted.

According to an embodiment, the camera assembly further includes: a base configured to be fixed at a side of a housing of the camera assembly; and a movable body configured to be fixedly coupled to the motor and rotatably mounted on the base.

According to an embodiment, the camera assembly further includes: a fixed shaft configured to rotatably mount the movable body on a first point of the base; and at least one movable shaft configured to be coupled to the base at a respective second point, that is spaced from the first point, each of the at least one movable shaft received in a corresponding slot in the movable body such as to support sliding motion of the movable body.

According to an embodiment, the camera assembly further includes: a fixed shaft configured to rotatably mount the movable body on a first point of the base; and at least one movable shaft configured to be coupled to the movable body at a respective second point, that is spaced from the first point, each of the at least one movable shaft received in a corresponding slot in the base such as to support sliding motion of the movable body.

According to an embodiment, in a case where the movable body rotates around the fixed shaft, the at least one movable shaft is received in the corresponding slot, without interference from the corresponding slot, while supporting the sliding motion of the movable body.

According to an embodiment, the at least one movable shaft includes two movable shafts that are received in a first corresponding slot and a second corresponding slot, respectively.

According to an embodiment, an end of the elastic body is coupled to the base and another end of the elastic body is coupled to the movable body such as to cause tension in the elastic body.

According to an embodiment, a point where the end of the elastic body is coupled to the base is farther than a point where the another end of the elastic body is coupled to the movable body from the second axis.

According to an embodiment, the base has a first hollow and the movable body has a second hollow axially corresponding to the first hollow, and the motor shaft passes through the first hollow and the second hollow.

According to an embodiment, the belt engages with a distal end of the motor shaft that is passed through the first hollow and the second hollow.

According to an embodiment, a pinion is provided at the distal end of the motor shaft and gear teeth are provided at an outer circumferential surface of the pulley, and threads defined at an inner surface of the belt engage with the pinion and the gear teeth.

According to an embodiment, a head of the fixed shaft is positioned higher than the movable body mounted on the base such as to allow the movable body to rotate around the fixed shaft relative to the base while the fixed shaft is coupled to the base.

According to an embodiment, the camera assembly further includes a fastener configured to fixedly couple the motor and the movable body, wherein a head of the fastener is received in a through hole with a clearance, such as to allow a contact between the base and the movable body without interrupting turning motion of the movable body with respect to the base.

According to one or more embodiments, a camera assembly is provided. The camera assembly includes: a motor configured to generate a driving power; a motor shaft that extends from the motor, such as to define a first axis, and is configured to rotate by the driving power of the motor; a pulley configured to rotate on a second axis, that is spaced from the first axis, according to rotation of the motor shaft; a belt configured to couple the motor shaft and the pulley, and convert the rotation of the motor shaft to rotation of the pulley; a camera module configured to be mounted on the pulley and rotate together with the pulley; and an elastic body configured to apply a biasing force to the motor shaft such as to bias the motor shaft in a direction away from the second axis; a housing; a base fixed on the housing; and a movable body fixedly coupled to the motor and rotatably coupled to the base.

According to an embodiment, the camera assembly further includes: a fixed shaft configured to rotatably mount the movable body on a first point of the base; and a movable shaft configured to be coupled to the base at a second point, that is spaced from the first point, and received in a corresponding slot in the movable body such as to support sliding motion of the movable body.

According to an embodiment, the camera assembly further includes: a fixed shaft configured to rotatably mount the movable body on a first point of the base; and a movable shaft configured to be coupled to the movable body at a second point, that is spaced from the first point, and received in a corresponding slot in the base such as to support sliding motion of the movable body.

According to an embodiment, an end of the elastic body is coupled to the base and another end of the elastic body is coupled to the movable body such as to cause tension in the elastic body.

According to an embodiment, a head of the fixed shaft is positioned higher than the movable body mounted on the base such as to allow the movable body to rotate around the fixed shaft relative to the base while the fixed shaft is coupled to the base.

According to one or more embodiments, a method for assembling a camera assembly is provided. The method includes: fixedly coupling a motor to a movable body; rotatably coupling the movable body to a base; installing an elastic body such that two ends of the elastic body are interposed between the movable body and the base; fixedly mounting the base on a housing; and coupling, using a timing belt, a motor shaft to a pulley, the motor shaft extending from the motor and passing through a hollow of the movable body and a hollow of the base, and the pulley having a camera module mounted thereon.

According to an embodiment, the method further includes balancing tension of the timing belt with a biasing force of the elastic body, wherein the tension of the timing belt applies a force to the motor shaft in a direction towards a rotation axis of the pulley, and the biasing force of the elastic body biases the motor shaft in a direction away from the rotation axis of the pulley.

DETAILED DESCRIPTION

Figure 1:
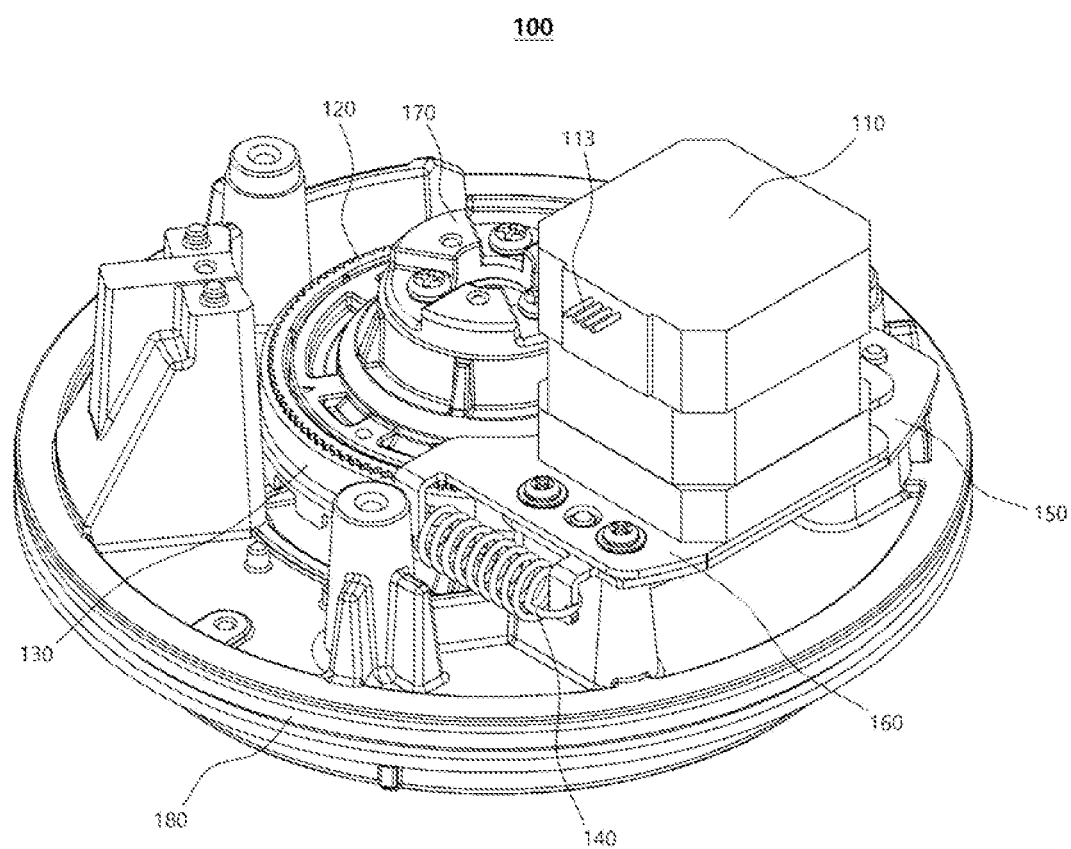
FIG. 1 is an assembled perspective view of a camera assembly according to an embodiment.

Benefits and features of embodiments of the present disclosure, and methods for accomplishing the same will become apparent with reference to embodiments described below in detail in conjunction with the accompanying drawings. However, the embodiments disclosed herein are all example embodiments, and thus, the disclosure is not limited to these embodiments disclosed below, and may be implemented in various forms. The example embodiments are merely provided to make the disclosure complete and to fully inform the scope of the disclosure to those ordinarily skilled in the art. Like reference numerals refer to like elements throughout the specification.

Unless otherwise defined, all terms (including technical and scientific terms) used herein may be used in a sense that may be commonly understood by those of ordinary skill in the art. In addition, the terms defined in the commonly used dictionaries should not be ideally or excessively interpreted unless they are specifically defined clearly.

The terms used herein are for the purpose of describing embodiments and are not intended to be limiting of the disclosure. Herein, the singular also includes the plural unless specifically stated otherwise in the phrase. The term "comprises" and/or "comprising" as used herein does not exclude the presence or addition of one or more other components in addition to the mentioned components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the following description, when an element is referred to as being "above" or "on" another element, it may be directly on the other element while making contact with the other element or may be above the other element without making contact with the other element.

Hereinafter, non-limiting example embodiments of the present disclosure will be described in detail with reference to the accompanying drawings.

Figure 2:
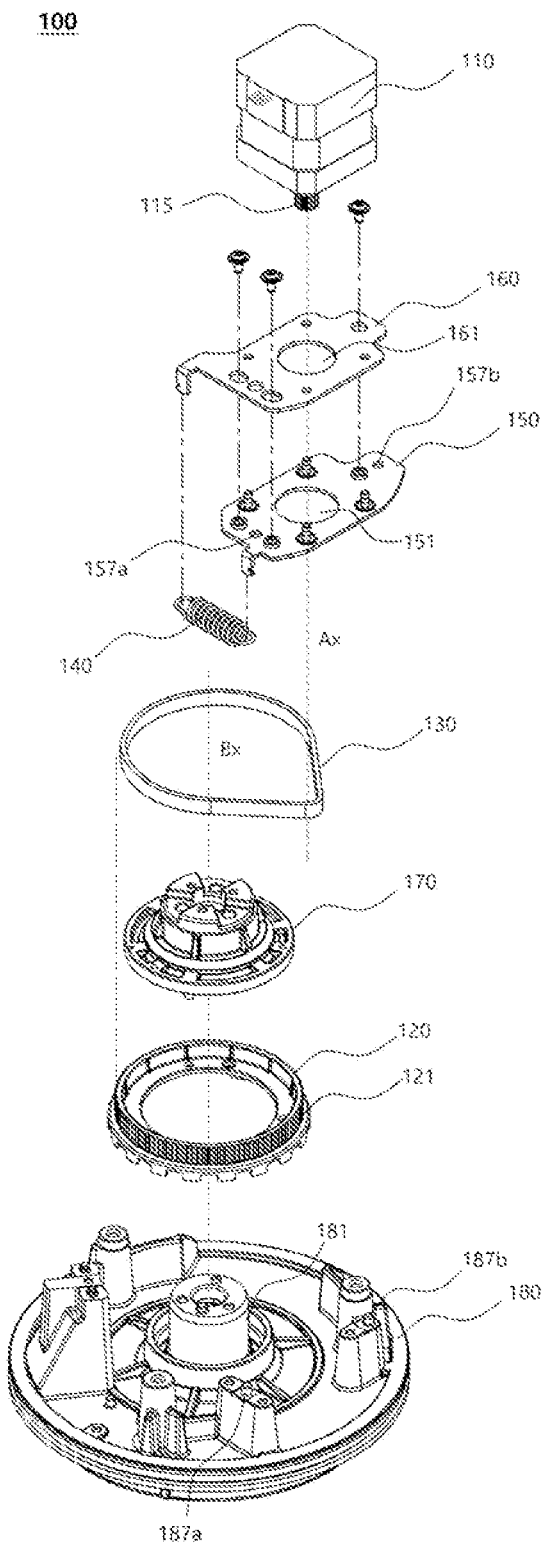
FIG. 2 is an exploded perspective view of the camera assembly according to an embodiment.

FIG. 1 is an assembled perspective view of a camera assembly 100 according to an embodiment and FIG. 2 is an exploded perspective view of the camera assembly 100. camera assembly 100 may include a motor 110, pulley 120, a timing belt 130, an elastic body 140, a base 150 and a movable body 160.

The driving power generated by the motor 110 may be transmitted to the motor shaft 115 which rotates by the driving power of the motor 110 around a first axis Ax. In this regard, the motor 110 may connect to a power supply (not shown) via terminals 113 in order to receive power from the power supply.

Such driving power can be transmitted via a timing belt 130 to a pulley 120 which rotates around a second axis Bx and is spaced from the first axis Ax. Specifically, the timing belt 130 couples the motor shaft 115 and the pulley 120, and converts the rotation of the motor shaft 115 to the rotation of the pulley 120. Thus, a portion of the timing belt 130 that is proximate to the first axis Ax is coupled to the motor shaft 115, and another portion of the timing belt 130 surrounding the second axis Bx is coupled to the outer circumferential surface of the pulley 120.

A bracket 170 on which a camera module (not shown) is mounted is fixedly coupled with the pulley 120 and rotates together with the pulley 120. Thus, the camera module rotates according to the rotation of the pulley 120.

In this regard, the elastic body 140 applies a biasing force in the direction in which the first axis Ax is away from the second axis Bx. The elastic body 140 of FIGS. 1 and 2 is illustrated as a coil spring, but it is not limited to the coil spring. It can be replaced with other flexible members as long as they are capable of applying tensions. According to an example embodiment, a base 150 and a movable body 160 can be used such that the elastic body 140 applies such a force to the motor shaft 115.

Specifically, the movable body 160 is fixedly coupled to the motor 110 and rotatably coupled to the base 150. A specific mechanism for tilting motion will be described later in reference to FIG. 4. Finally, an end of the elastic body 140 is coupled to a point of the base 150, and the other end of the elastic body 140 is coupled to a point of the movable body 160, which enables the elastic body 140 to be tensioned such as to provide a biasing force.

As such, based on to an interaction among the movable body 160, the base 150 and the elastic body 140, the tension of the timing belt 130 applying a force to the motor shaft 115 in a direction towards the second axis Bx and the biasing force of the elastic body 140 applying a force to the motor shaft 115 in a direction away from the second axis Bx are balanced such that the distance between the first axis and the second axis is adaptively adjusted.

Referring again to FIG. 2, an assembly including the pulley 120 and the bracket 170 is rotatably supported on a support member 181 in a lower case 180 of a housing. For brevity, outer components such as the upper case of the housing, other than the lower case 180 of the housing, are not shown in FIGS. 1 and 2.

As described above, in order to adaptively adjust the position of the motor shaft 115 under the biasing force of the elastic body 140, the base 150 and the movable body 160 can be used. First, the base 150 is fixed on the housing of the camera assembly 100. Referring to FIG. 2, through holes 157a, 157b formed on the base 150 may be coupled to corresponding protrusions 187a, 187b formed on the lower case 180 such that the base 150 is fixed on the housing. Such protrusions 187a, 187b may be coupled with the through holes 157a, 157b by interference fit, but the scope of the disclosure is not limited to the example and other separate fasteners can be used as well.

In FIG. 2, each of the base 150 and the movable body 160 includes a hollow 151, 161, and each hollow 151, 161 is formed at the corresponding position. In this regard, the motor shaft 115 is disposed to pass through each hollow 151, 161. Thus, the timing belt 130 is coupled to the end (e.g. a distal end) of the motor shaft 115 passing through each hollow 151, 161.

Figure 3:
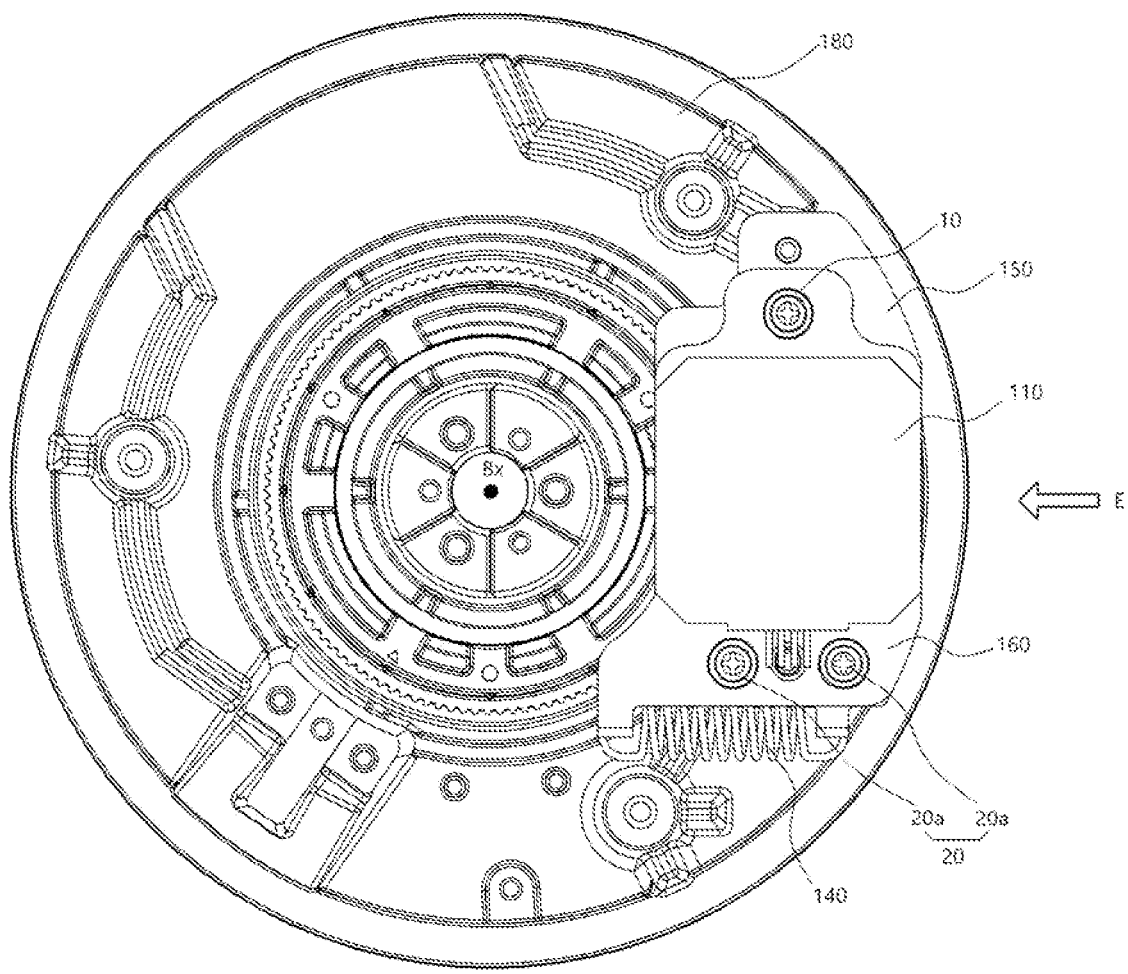
FIG. 3 is a top view of the camera assembly according to an embodiment.
Figure 4:
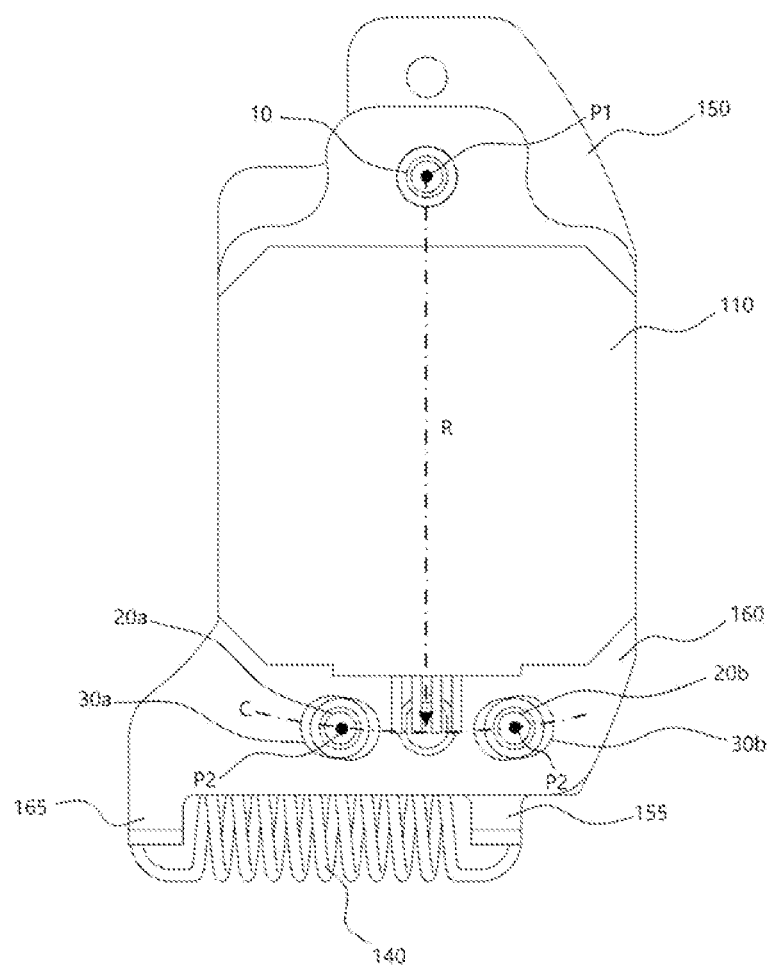
FIG. 4 is a top view showing a base, a movable body, and an elastic body of the camera assembly according to an embodiment.

FIG. 3 is a top view of the camera assembly 100 from FIG. 1, and FIG. 4 is a top view showing the base 150, the movable body 160, and elastic body 140 of the camera assembly 100. Here, the base 150 is fixed on the lower case 180 without relative motion, but the movable body 160 and the motor 110 which are fixedly coupled to each other are configured to turn on a fixed shaft 10 of the base 150 within a predetermined range.

Specifically, the fixed shaft 10 rotatably couples the movable body 160 at the first point P1 of the base 150. In this regard, at least one movable shaft 20a, 20b is spaced from the first point P1, coupled to the base 150 at the second point(s) P2 and received in the corresponding slots 30a, 30b on the movable body 160, and supports sliding motion of the movable body 160.

According to embodiments, the movable shaft 20 includes two movable shafts 20a, 20b, the at least one slot includes two slots 30a, 30b, and the two movable shafts 20a, 20b are received in the two slots 30a, 30b, respectively. Two or more movable shafts and slots may be used to avoid relative shakings which may be generated in a direction corresponding to the rotation radius R of FIG. 4 in a case where only one movable shaft and one slot are used.

When the movable body 160 rotates on the fixed shaft 10, the movable shafts 20a, 20b are received in the slots 30a, 30b without interference while supporting the sliding motion of the movable body 160. To this end, the slots 30a, 30b illustrated in FIG. 4 receive the movable shafts 20a, 20b, respectively, and are elongated in the circumferential direction C according to the rotation radius R extending from the first point P1. Thus, even though the movable body 160 rotates around the first point P of the base 150 with a predetermined angle, there is no interference between the movable shafts 20a, 20b and the slots 30a, 30b.

In FIGS. 3 and 4, a slot(s) is formed on the movable body 160 and a movable shaft(s) is formed on the base 150, but the same function may also implemented by the opposite configuration. According to another embodiment, a movable shaft(s) may be formed on the movable body 160 at the second point P2 and received in a corresponding slot(s) on the base 150 in order to support the sliding motion of the movable body 160.

Meanwhile, an end of the elastic body 140 is coupled to a latch 165 protruded from the movable body 160 and the other end of the elastic body 140 is coupled to a latch 155 protruded from the base 150. In this regard, the latch 155 of the base 150 is positioned farther from the second axis Bx than the latch 165 of the movable body 160. Thus, when the movable body 160 turns clockwise around the first position P1, that is, the motor shaft 115 moves toward the second axis Bx in the left direction of FIG. 4, the elastic body 140 is stretched to have a tension therein. As a result, the tension of the elastic body 140 functions as a biasing force to resist the movement and is balanced with the tension of the timing belt 130. As described above, the elastic body 140 is configured to generate the tension as a biasing force between the movable body 160 and the base 150, but the scope of the disclosure is not limited to this example and the compressive force of the elastic body 140 can be used as the biasing force as well.

Figure 5:
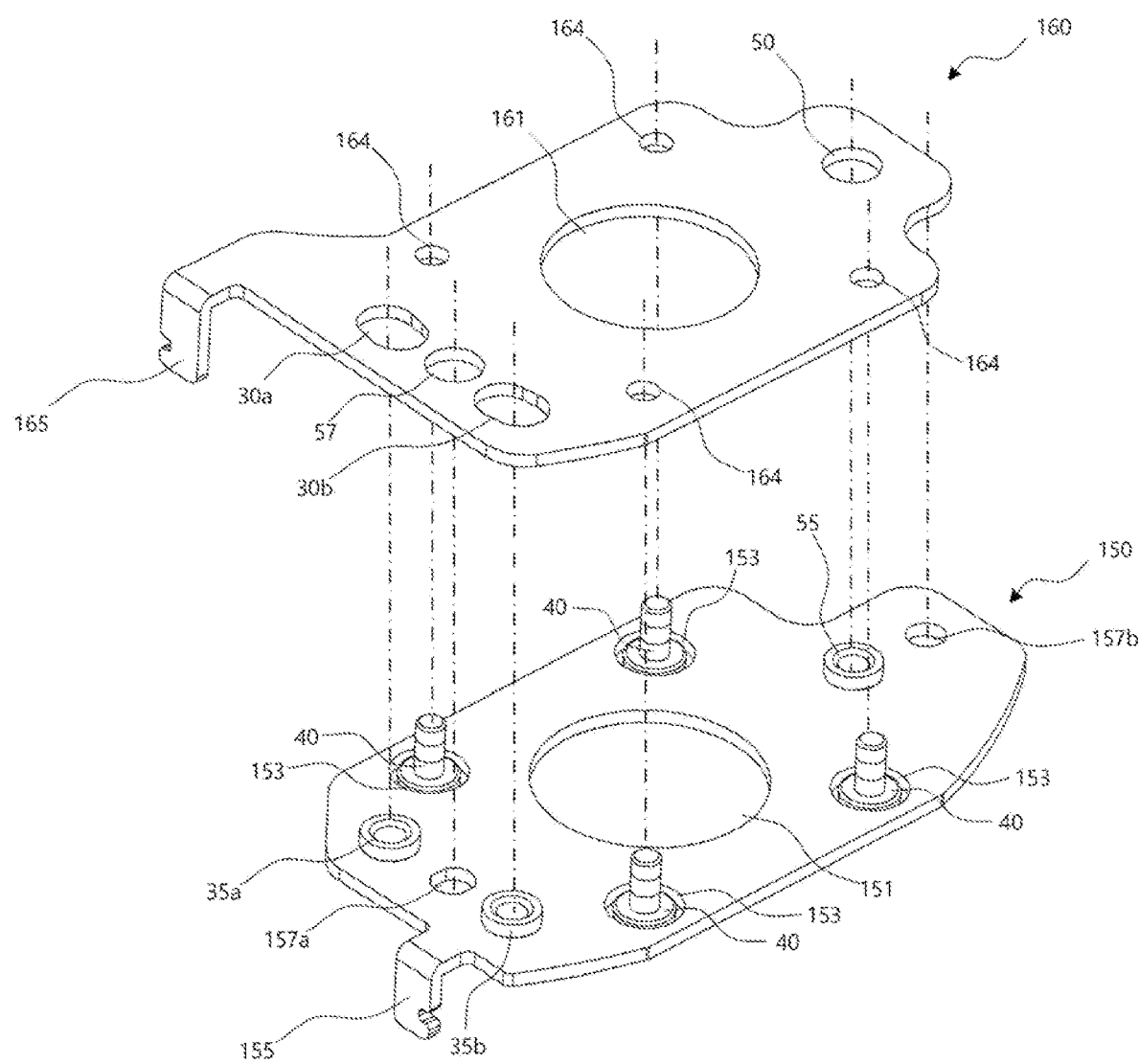
FIG. 5 is a drawing illustrating a connection between a movable body and the base according to an embodiment.

FIG. 5 is a drawing illustrating a connection between the movable body 160 and the base 150 according to an embodiment. The through holes 157a, 157b formed on the base 150 are coupled to the protrusion 187a, 187b (refer to FIG. 2) of the lower case 180. To this end, the through hole 57 has a clearance around the end of the protrusion 187a such that the end of the protrusion 187a passing through the through hole 157a does not cause any interference. In addition, the protrusion 187b passing through the through hole 157b does not overlap with the movable body 160 positioned above the base 150 and thus it does not interrupt the movement of the movable body 160.

Next, at least one fastener 40 passes through a through hole 164 formed on the movable body 160 and is coupled with the motor 110 such that the motor 110 is completely fixed on the movable body 160. In addition, a head 41 (refer to FIG. 8) of the at least one fastener 40 is received in the through hole 153 having a clearance 154 (refer to FIG. 8) with respect to the base 150, which guarantees a face-to-face contact between the base 150 and the movable body 160 without interrupting the turning motion of the movable body 160.

Without a through hole 153 with such a clearance, the movable body 160 and the base 150 may not completely contact to each other. In addition, without the clearance 154 of the through hole 153, the turning motion of the movable body 160 may be interrupted due to interference between the through hole 153 and the head 41 of the fastener 40.

Additionally, a through hole 50 of the movable body 160 and a through hole 55 of the base 150 are used to receive the fixed shaft 10 (refer to FIG. 4), and the slots 30a, 30b of the movable body 160 and through holes 35a, 35b of the base 150 are used to receive the movable shafts 20a, 20b (refer to FIG. 4). Lastly, the latch 165 formed at a side of the movable body 160 and the latch 155 formed at a side of the base 150 are connected to respective ends of the elastic body 140.

Figure 6:
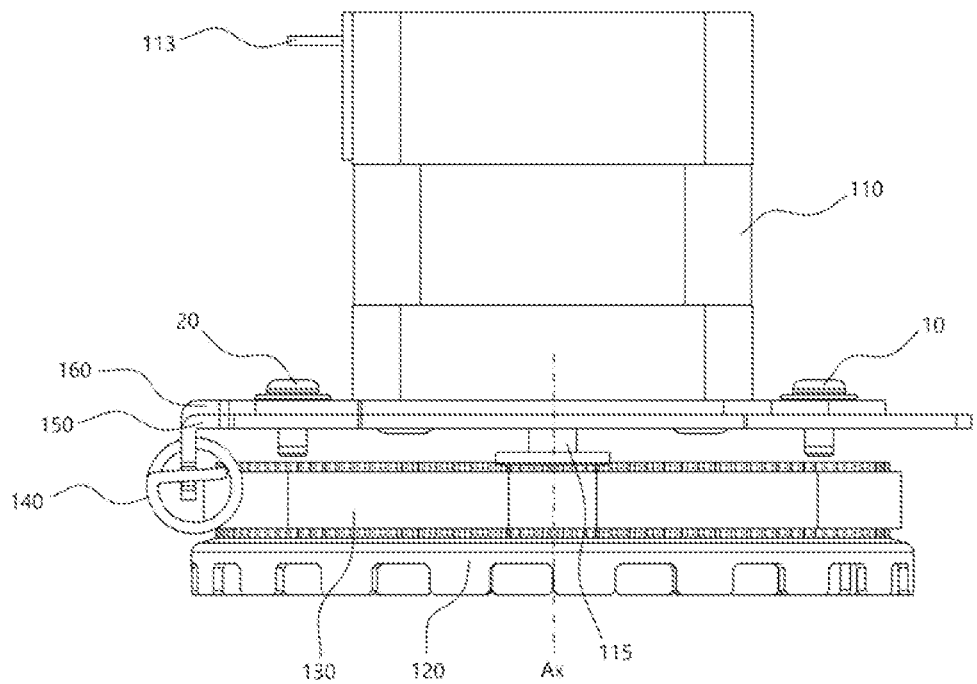
FIG. 6 is a view of the camera assembly without the lower case.
Figure 7:
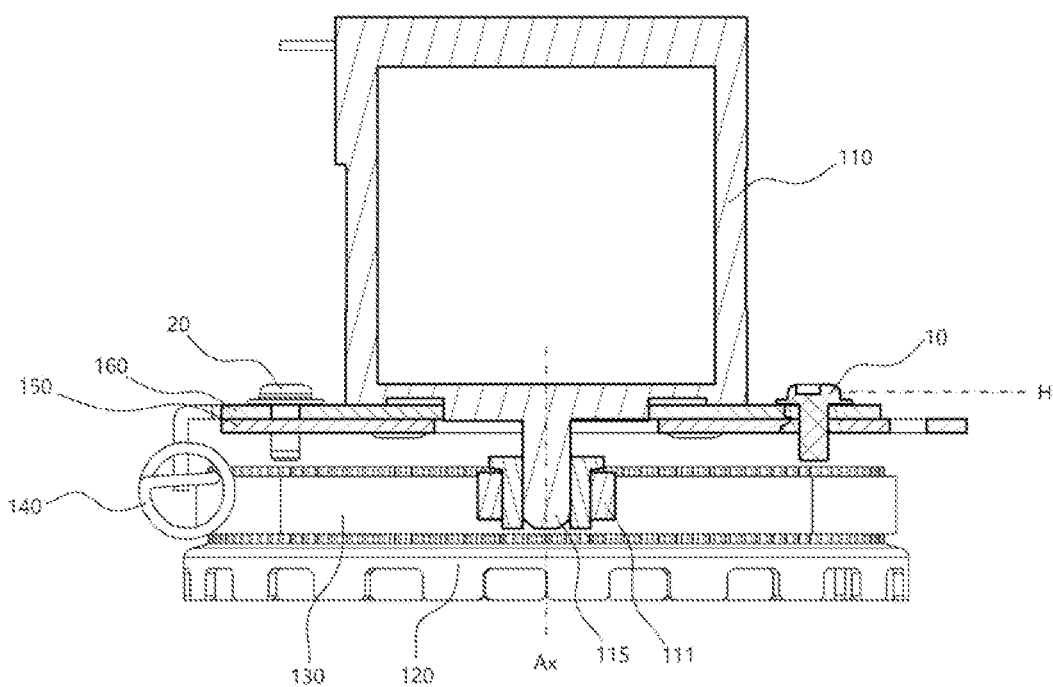
FIG. 7 is a longitudinal sectional view taken from the camera assembly of FIG. 6 along the vertical direction.

FIG. 6 is a view of the camera assembly 100 without the lower case 180 in the direction E (refer to FIG. 3) and FIG. 7 is a longitudinal sectional view taken from the camera assembly 100 of FIG. 6 along the vertical direction.

The motor shaft 115 extends from the motor 110 in the direction along the first axis Ax, and a pinion 111 is defined at the end of the motor shaft 115 to be coupled with the timing belt 130. The rotation of the pinion 111 causes the revolution of the timing belt 130 and the pulley 120 engaged with the timing belt 130 also rotates accordingly. To this end, the diameter of the pinion 111 is quite smaller than the diameter of the pulley 120 and a speed reduction and a torque increase are generated. The rotation amount of the pulley 120 can be detected by a rotation sensor and controlled by a motor controller not shown in the drawings.

Referring to FIG. 7, the fixed shaft 10 and the movable shaft 20 are implemented, for example, by pins and jointly couple the movable body 160 rotatably on the base 150. Here, each pin may be installed with no contact with elements other than the movable body 160 and the base 150. The fixed shaft 10 and the movable shaft 20, more particularly, the head H of the pin defining the fixed shaft 10 may be positioned higher than the movable body 160 mounted on the base 150. Thus, even though the fixed shaft 10 is completely coupled to the base 150, the movable body 160 is allowed to rotate on the fixed shaft 10 of the base 150.

Figure 8:
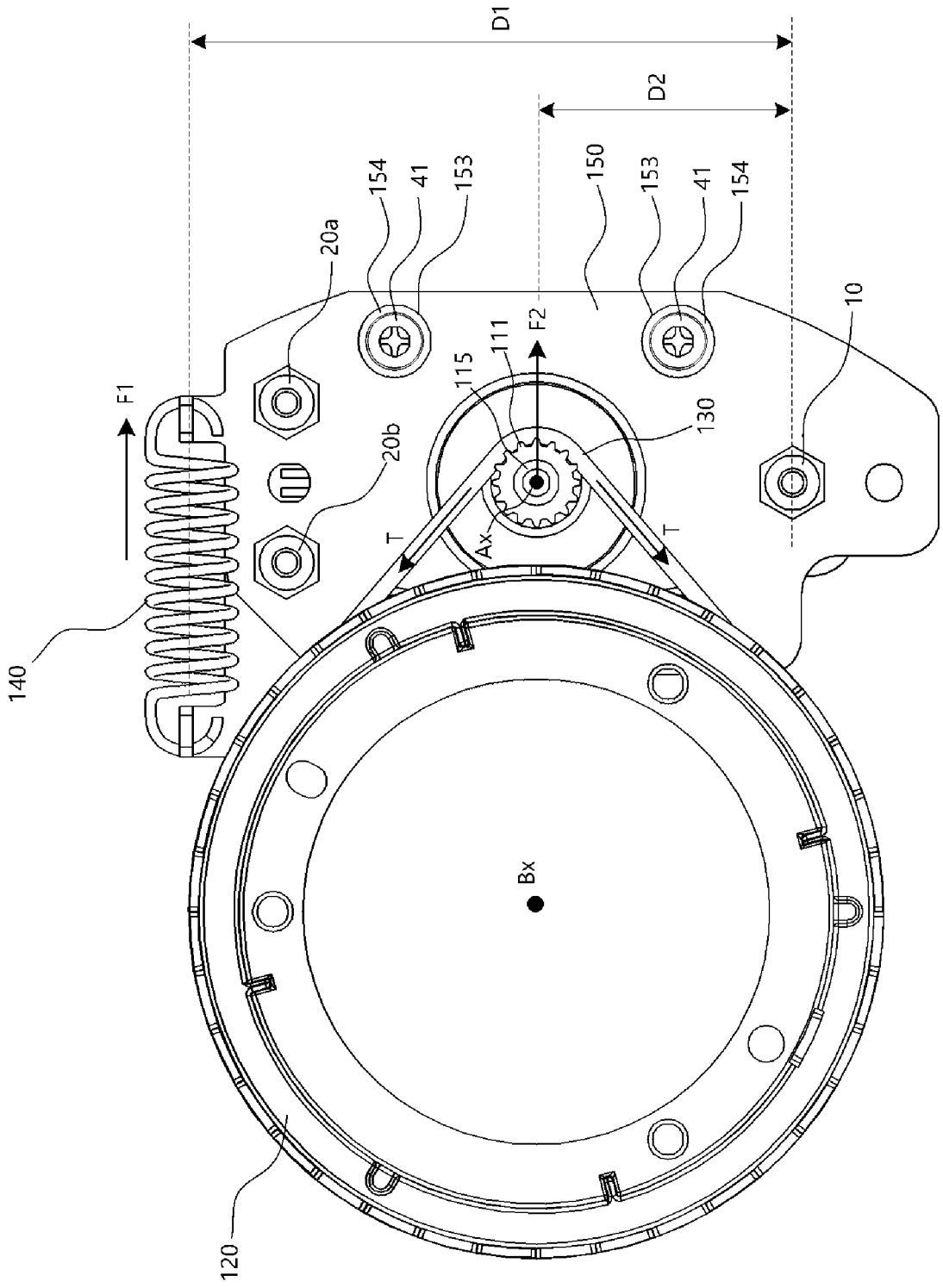
FIG. 8 is a bottom view of the camera assembly according to an embodiment without a lower case.

FIG. 8 is a bottom view of the camera assembly 100 from FIG. 1 without a lower case 180. Referring to 8, a pinion 111 is defined at the end of the motor shaft 115 forming the first axis Ax, and threads on the inner side of the timing belt 130 engages with the pinion 111. In the same way, threads 131 on the inner side of the timing belt 130 also engage with the gear teeth 121 (refer to FIG. 2) on the outer circumferential surface of the pulley 120.

To this end, the biasing force F1 generated from the elastic body 140 installed between the movable body 160 and the base 150, and the tension T generated in the timing belt 130 are adaptively balanced. Accordingly, even when such a balance is broken for some reasons, the distance between the first axis Ax and the second axis Bx is adjusted by itself and balanced again at another equilibrium point.

For example, in a case where the tension of the timing belt 130 is too high, the tension becomes greater than the biasing force F1 of the elastic body 140 and the motor shaft 115 or the first axis Ax moves toward the second axis Bx. Accordingly, the tension T of the timing belt 130 would be decreased as a result. On the contrary, in a case where the tension of the timing belt 130 is too low, the tension becomes less than the biasing force of the elastic body 140 and the motor shaft 115 or the first axis Ax moves away from the second axis Bx. Accordingly, the tension T of the timing belt 130 would be increased as a result. Thus, if the intrinsic bias of the elastic body 140 is set to be a proper value, the tension of the timing belt 130 would be consistently maintained in spite of error factors such as dimensions of components and eccentricity caused during an assembling process.

In a specific design, the biasing force F1 of the elastic body 140 can be estimated from a force balance equation in order to maintain the tension T of the timing belt 130 within a desired range. Assuming the tension of the timing belt 130 is "T" and the reaction force of the motor shaft 115 is "F2", the following equation 1 is satisfied.

$$F2 = 2 \times T \times \cos\left(\frac{\theta}{2}\right) \quad \text{[Equation 1]}$$

Here, θ is an angle formed by two parts of the timing belt 130 which pulls the motor shaft 115.

In addition, "F1" can be expressed by "F2" via a torque balance equation with reference to the fixed shaft 10, as shown in the following equation 2.

$$F1 = \frac{F2 \times D2}{D1} \quad \text{[Equation 2]}$$

By combining the equations 1 and 2, "F1" can be expressed by "T" as shown in the following equation 3.

$$F1 = \frac{2 \times D2 \times T \times \cos\left(\frac{\theta}{2}\right)}{D1} \quad \text{[Equation 3]}$$

As a result, the biasing force can be estimated, that is, the tension of the elastic body 140, based on a designed tension T of the timing belt 130 according to the equation 3. According to an example embodiment, the tension T of the timing belt 130 may be equal to or 1.3 times greater than the maximum driving power of the motor 110.

According to an embodiment, the camera assembly described above may be assembled by using the following method. Referring to FIGS. 2, 4, and 5 again, first, the motor 110 and the movable body 160 are fixedly coupled by the fastener 40 and the movable body 160 is rotatably coupled to the base 150. To this end, the fixed shaft 10 is coupled to the first point P1 of the base 150 such that the movable body 160 can be rotatable on the fixed shaft 10, and the two movable shafts 20a, 20b installed on the base 150 are received in the two slots 30a, 30b defined in the movable body 160, respectively. As such, when the motor 110 and the movable body 160 are installed on the base 150, the motor shaft 115 extended from the motor 110 passes through both the hollow 161 of the movable body 160 and the hollow 151 of the base 150.

Next, the elastic body 140 is installed such that respective ends of the elastic body 140 are interposed between a point of the movable body 160 and another point of the base 150. In addition, the base 150 on which the motor 110 and the movable body 160 are installed is fixedly coupled to the housing at some positions (e.g. protrusion 187a and protrusion 187b).

Lastly, the motor shaft 115, that extends from the motor 110, and the pulley 120 on which the camera module is mounted are coupled in common by the timing belt 130. As such, when the coupling by the timing belt 130 is completed, the tension of the timing belt 130 and the biasing force from the elastic body 140 become balanced. Specifically, the tension of the timing belt 130 applying a force to the motor shaft 115 in a direction towards the second axis Bx and the biasing force of the elastic body 140 applying a force to the motor shaft 115 in a direction away from the second axis Bx are balanced such that the distance between the first axis and the second axis is adaptively adjusted. Accordingly, the tension applied to timing belt 130 can be adaptively maintained within a designed range.

According to the above embodiments, it is possible to apply a proper tension to the timing belt without separate assembling tools and adaptively manage the tension of the timing belt within a designed range despite various distributions in the related components.

Additionally, even though there may be a little decentering or eccentricity in some components when installing the camera assembly in site, the tension variation in the timing belt can be minimized and the same tension can be applied again even after reassembling the camera assembly.

Embodiments of the present disclosure have been described herein. However, it will be understood by those skilled in the art that various modifications may be made without departing from the gist of the disclosure. Therefore, it is to be understood that the scope of the disclosure is not limited to the above-mentioned embodiments but is intended to include various modifications and equivalents included within the spirit and scope of the present disclosure.

What is claimed is:

1. A camera assembly comprising:
    a motor configured to generate a driving power;
    a motor shaft that extends from the motor, such as to define a first axis, and is configured to rotate by the driving power of the motor;
    a pulley configured to rotate on a second axis, that is spaced from the first axis, according to rotation of the motor shaft;
    a belt configured to couple the motor shaft and the pulley, and convert the rotation of the motor shaft to rotation of the pulley, and tension of the belt applies a force to the motor shaft in a direction towards the second axis;
    a camera module configured to be mounted on the pulley and rotate together with the pulley;
    an elastic body configured to apply a biasing force to the motor shaft such as to bias the motor shaft in a direction away from the second axis;
    a base configured to be fixed at a side of a housing of the camera assembly;
    a movable body configured to be fixedly coupled to the motor and rotatably mounted on the base;
    a fastener configured to fixedly couple the motor and the movable body,
    a fixed shaft configured to rotatably mount the movable body on a first point of the base; and
    at least one movable shaft configured to be coupled to one from among the base and the movable body at a respective second point, that is spaced from the first point,
    wherein the at least one movable shaft comprises two movable shafts that are received in a first corresponding slot and a second corresponding slot, respectively, and the first corresponding slot and the second corresponding are in the other from among the base and the movable body such as to support sliding motion of the movable body, and
    wherein the first corresponding slot and the second corresponding are elongated in a circumferential direction according to a same rotation radius extending from the first point.

2. The camera assembly of claim 1, wherein in a case where the movable body rotates around the fixed shaft, the two movable shafts are received in the first corresponding slot and the second corresponding slot, respectively, without interference from the first corresponding slot and the second corresponding slot, while supporting the sliding motion of the movable body.

3. The camera assembly of claim 1, wherein an end of the elastic body is coupled to the base and another end of the elastic body is coupled to the movable body such as to cause tension in the elastic body.

4. The camera assembly of claim 3, wherein a point where the end of the elastic body is coupled to the base is farther than a point where the another end of the elastic body is coupled to the movable body from the second axis.

5. The camera assembly of claim 1, wherein the base has a first hollow and the movable body has a second hollow axially corresponding to the first hollow, and the motor shaft passes through the first hollow and the second hollow.

6. The camera assembly of claim 5, wherein the belt engages with a distal end of the motor shaft that is passed through the first hollow and the second hollow.

7. The camera assembly of claim 6, wherein a pinion is provided at the distal end of the motor shaft and gear teeth are provided at an outer circumferential surface of the pulley, and threads defined at an inner surface of the belt engage with the pinion and the gear teeth.

8. The camera assembly of claim 1, wherein a head of the fixed shaft is positioned higher than the movable body mounted on the base such as to allow the movable body to rotate around the fixed shaft relative to the base while the fixed shaft is coupled to the base.

9. The camera assembly of claim 1, wherein a head of the fastener is received in a through hole with a clearance, such as to allow a contact between the base and the movable body without interrupting turning motion of the movable body with respect to the base.

10. The camera assembly of claim 1, therein the two movable shafts are configured to be coupled to the base at the respective second point, that is spaced from the first point, and the first corresponding slot and the second corresponding slot are in the movable body.

11. The camera assembly of claim 1, wherein the two movable shafts are configured to be coupled to the movable body at the respective second point, that is spaced from the first point, and the first corresponding slot and the second corresponding slot are in the base.

12. A method for assembling a camera assembly, the method comprising:
fixedly coupling a motor to a movable body;
rotatably coupling the movable body to a base;
installing an elastic body such that two ends of the elastic body are interposed between the movable body and the base;
fixedly mounting the base on a housing;
coupling, using a timing belt, a motor shaft to a pulley, the motor shaft extending from the motor and passing through a hollow of the movable body and a hollow of the base, and the pulley having a camera module mounted thereon;
providing a fixed shaft that rotatably mounts the movable body on a first point of the base; and
coupling at least one movable shaft to one from among the base and the movable body at a respective second point, that is spaced from the first point,
wherein the at least one movable shaft includes a first movable shaft and a second movable shaft,
wherein the method further comprises providing the first movable shaft and the second movable shaft in a first corresponding slot and a second corresponding slot, respectively, such as to support sliding motion of the movable body,
wherein the first corresponding slot and the second corresponding are in the other from among the base and the movable body, and
wherein the first corresponding slot and the second corresponding are elongated in a circumferential direction according to a same rotation radius extending from the first point.

13. The method of claim 12, further comprising:
balancing tension of the timing belt with a biasing force of the elastic body,
wherein the tension of the timing belt applies a force to the motor shaft in a direction towards a rotation axis of the pulley, and the biasing force of the elastic body biases the motor shaft in a direction away from the rotation axis of the pulley.

* * * * *